(12) United States Patent
Fahringer

(10) Patent No.: US 6,349,624 B1
(45) Date of Patent: Feb. 26, 2002

(54) SPRINKLER TOOL

(76) Inventor: Stephen A. Fahringer, 3750 Trogon Way, Las Vegas, NV (US) 89103

( * ) Notice: Subject to any disclaimer, the term of this patent is extended or adjusted under 35 U.S.C. 154(b) by 0 days.

(21) Appl. No.: 09/284,595

(22) PCT Filed: Oct. 16, 1997

(86) PCT No.: PCT/US97/18603

§ 371 Date: Apr. 16, 1999

§ 102(e) Date: Apr. 16, 1999

(87) PCT Pub. No.: WO98/17441

PCT Pub. Date: Apr. 30, 1998

(51) Int. Cl.[7] ............................................. B25B 23/08
(52) U.S. Cl. .......................... 81/441; 81/459; 81/177.8; 81/125.1; 7/157; 7/168
(58) Field of Search ....................... 81/441, 459, 177.7, 81/177.8, 177.9, 125.1, 177.1, 427.5, 53.2, 488; 7/157, 167–168, 170

(56) References Cited

U.S. PATENT DOCUMENTS

| | | | |
|---|---|---|---|
| 1,542,336 A | | 6/1925 | Carlberg |
| 3,328,999 A | * | 7/1967 | Peterson et al. ................ 7/168 |
| 3,952,618 A | | 4/1976 | Seamon |
| 4,350,064 A | | 9/1982 | Markle ......................... 81/437 |
| 4,553,280 A | | 11/1985 | Stright |
| 4,856,132 A | * | 8/1989 | Burns et al. .................... 7/158 |
| 4,960,016 A | | 10/1990 | Seals .......................... 81/177.4 |
| 5,184,531 A | | 2/1993 | Wickson et al. |
| 5,251,516 A | * | 10/1993 | Desaulniers ................ 7/158 X |
| 5,542,322 A | * | 8/1996 | Knox et al. ................. 81/177.8 |
| 5,871,204 A | * | 2/1999 | Spirer ........................ 81/177.8 |

FOREIGN PATENT DOCUMENTS

| | | |
|---|---|---|
| DE | 23 45 569 | 3/1975 |
| GB | 276509 | 9/1927 |

* cited by examiner

Primary Examiner—D. S. Meislin
(74) Attorney, Agent, or Firm—Dorsey & Whitney LLP

(57) ABSTRACT

The tool of the present invention comprises two handle/body members each pivotally coupled to a respective end of a generally straight, rigid stem. Each handle/body member is adapted to function as a handle when positioned transversely, preferably at 90 degrees, with respect to the stem or as a working head when the central longitudinal axis of a handle/body member is positioned generally along or parallel to the longitudinal axis of the stem. In the working end mode, each handle/body member is adapted to perform at least two tasks: riser removal and installation, and reconditioning threads or tapping, i.e., acting a typical screw tap.

16 Claims, 18 Drawing Sheets

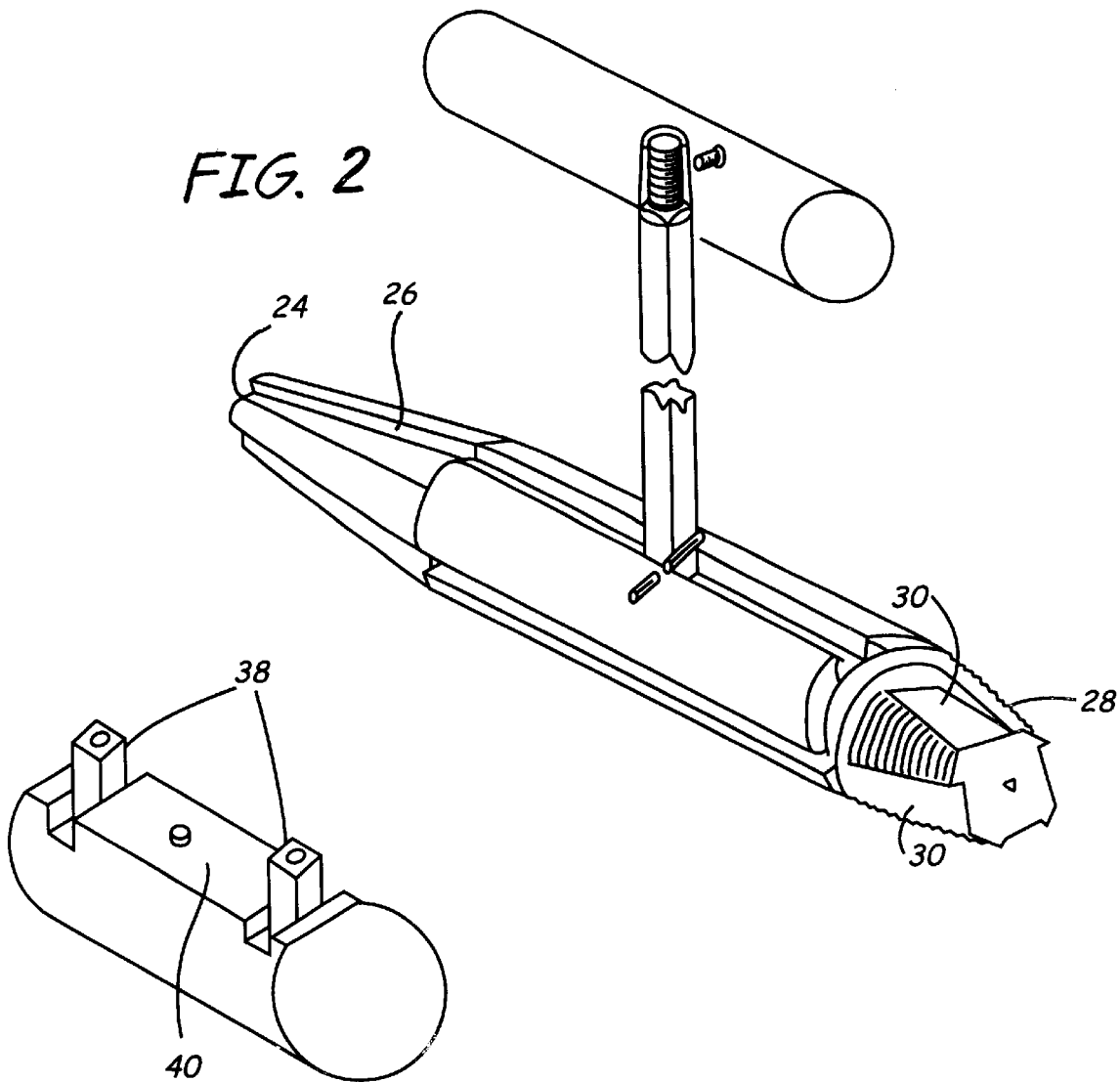

SPRINKLER TOOL

BACKGROUND OF THE INVENTION

1. Field of the Invention

The present invention relates generally to hand tools and, more specifically, to a hand tool for use on pipes, conduits, fittings and the like, particularly those for lawn, agricultural, landscape and garden sprinkler systems.

2. Description of Related Art

As used herein, the term "sprinkler system(s)" is intended to refer to any liquid delivery system and, more specifically, to any such system for above or below ground use. Sprinkler systems are probably best recognized for watering lawns or crops in residential and agricultural settings, respectively. Typically, a lawn sprinkler system is underground and comprises a water source, a network of linked conduits or pipes, usually formed of polyvinyl-chloride (PVC), connected to the water source, a flow control mechanism including off/on valves, timers, etc., and a plurality of liquid dispensing or dispersing sprinkler heads. The heads may be mounted directly on the pipes or on risers connected to the pipes and extending generally from the pipes to near the lawn surface. The heads are usually threadably mounted to the risers, and are frequently "pop-up" or extendable type heads which rise above the lawn or ground surface during operation.

One of the more difficult tasks in maintaining a sprinkler system in good working order, particularly one for use under a lawn, is repair or replacement of the sprinkler heads and/or risers, which are rather fragile and frequently damaged by aboveground activities such as lawn mowing, raking, fertilizing, trimming or planting. Generally, if the head/riser or riser/pipe connection or joint is damaged, a hole must be dug to reach the joint. There are tools which attempt to address this problem.

U.S. Pat. No. 3,952,618 (Seamon) discloses a device for extracting plastic risers from fittings of polyvinyl-chloride (PVC) water sprinkler pipes. While the device may be effective for removing risers, it would be more useful if it had an integral feature for repairing or rethreading a riser or pipe.

U.S. Pat. No. 5,184,531 (Wickson et al.) discloses a tool member for use in removing broken sprinkler tubes. The tool includes an elongated plate having a handle orthogonally mounted adjacent a one end of the plate. Side extensions defining an acute angle therebetween extend from the plate for projection into a broken conduit portion permitting its rotative threaded disengagement relative to the sprinkler structure. The handle is configured to include first and second threaded tap ends to permit the cleaning and aligning of existing threads within the PVC conduit. Although the Wickson et al. tube removal apparatus may work well for its intended function, it is not as compact as possible, also a problem with the Seamon device.

SUMMARY OF THE INVENTION

The present invention provides a tool primarily intended for use in pipe or conduit systems for removing fittings and repairing threads. The tool is particularly well adapted for working on underground sprinkler systems, e.g., for removing broken fittings, sprinkler heads, pipes and the like, and reconditioning threads.

In one embodiment, the tool comprises a body (the working end), an elongated, rigid stem, and a handle fixedly connected to the stem. Together the stem and handle form a "T" shape. The body is pivotally pinned to the stem, whereby it may be generally aligned with the longitudinal axis of the stem, or extend generally transverse thereto. The body has two ends, an "easy out" end and a tap end, and is adapted to perform at least three functions: sprinkler head or nipple removal and replacement, riser removal and installation, and rethreading or tapping the head-to-riser and/or riser-to-pipe connections.

The present invention provides a compact tool for performing several tasks with respect to sprinkler systems. It can be used to remove broken sprinkler risers, renew threads of fittings and provides a spanner wrench for the removal and tightening of sprinkler heads. The compactness of the tool is advantageous; one embodiment is only approximately 7 to 8 inches long, yet, when unfolded for use, a user can generate sufficient torque to remove risers and renew threads. Another advantage of the present invention is that a riser of an underground sprinkler system can be removed and replaced without digging a hole large enough to reach the riser and grip and manipulate it with a customary pipe wrench.

In another embodiment, the tool of the present invention comprises two handle/body members each pivotally coupled to a respective end of a generally straight, rigid stem. Each handle/body member is generally similar to the body (or working end) of the previously described embodiment, and is adapted to function as a handle when positioned transversely, preferably at 90°, with respect to the stem or as a working head when the central longitudinal axis of a handle/body member is positioned generally along or parallel to the longitudinal axis of the stem. In the working end mode, each handle/body member is adapted to perform at least two tasks: riser removal and installation, and reconditioning threads or tapping, i.e., acting as a typical screw tap. Yet another embodiment of the tool of the present invention includes dual function handle/body members wherein each handle/body member includes one end with a right-hand threaded portion for tapping or rethreading pipes, conduits, joints and the like, and one end with a left-hand or reverse threaded portion for use in pipe, riser, sprinkler head or nipple removal. In either of the second or third embodiments, one of the handle/body members may be adapted for use in removing and installing two different sizes of risers, heads or nipples, and the other may be adapted to cut an internal thread in or rethread two different sizes hole, pipe, conduit or the like.

In still another embodiment, the stem is eliminated, each handle/body member being provided with at least one opening for receiving a separate driver means, such as an alien wrench, ratchet drive tool, screw-driver like hex-head driver or the like. An opening (also intended to mean an aperture, hole, etc.) is preferably located at each end of the handle/body member, and the openings may be the open ends of a bore coextensive with the longitudinal central axis of the handle/body member. In this embodiment, a number of the dual function handle/body members described above may be made available in set of a plurality of sizes, in a manner similar to the sockets of a typical socket set. Each is adapted to work on a different size pipe, riser or the like. A number of handle/body members may be adapted to act exclusively as riser or pipe removal tools for different sizes of risers or pipes, and a number may be adapted to act exclusively as screw taps for different sizes of pipes. One or more of the handle/body members may take the general form of a typical screw die, i.e., a tool having a central opening with a tapered or cylindrical inside surface provided with threads or hardened threads whereby it may be used to thread or cut threads on the exterior surface of a pipe or the like.

These and other features and advantages of the present invention may be further understood with reference to the accompanying drawings and following description and claims.

BRIEF DESCRIPTION OF THE DRAWINGS

FIG. 2 is an isometric view of the tool with the handle in another position of use.

FIG. 3 is an isometric view of a portion of one embodiment of the body portion of the present invention.

DETAILED DESCRIPTION OF THE PREFERRED EMBODIMENT

The Figures depict the tool of the present invention and features and components thereof. Although the preferred embodiment of the tool is intended for use with liquid or fluid delivery systems, particularly underground lawn sprinkler systems, the tool could be used with above-ground systems and for working on any plumbing, piping or conduit system and the pipes, joints and fittings thereof.

With regard to means for fastening, mounting, attaching or connecting the components of the present invention to form the tool as a whole, unless specifically described as otherwise, such means are intended to encompass conventional fasteners such as machine screws, machine threads, rivets, nuts and bolts, toggles, pins, or the like. Unless specifically otherwise disclosed or taught, materials for making the components of the present invention are selected from appropriate materials such as aluminum, steel, tool steels, hard metals (e.g., cemented carbide alloys), metallic alloys, ceramic, various plastics and vinyls or the like, and appropriate methods including casting, extruding, molding and machining may be used.

Any references herein to front and back, right and left, top and bottom, upper and lower and horizontal and vertical are intended for convenience of description only, not to limit the present invention or its components to any one positional or spacial orientation. Such terms are to be read and understood with their conventional meanings.

Figure 1:
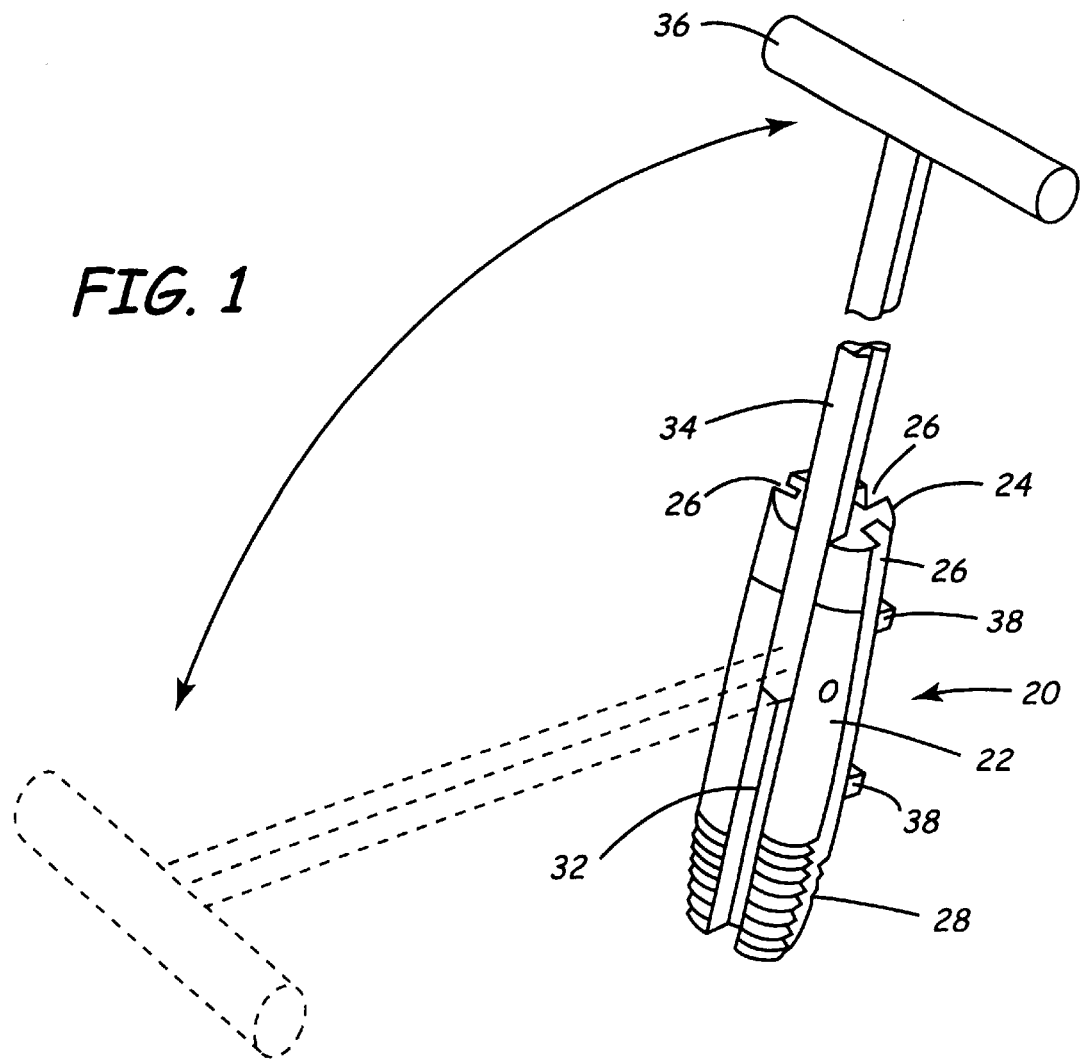
FIG. 1 is an isometric view of one embodiment of the sprinkler tool of the present invention.

A first embodiment of the tool of the present invention is depicted in FIGS. 1–3. The tool has a generally solid cylindrical body 20. Both ends of the body 20 are tapered, becoming smaller in diameter toward the ends from a generally cylindrical middle portion 22. As shown in FIG. 2, the degree of taper is not necessarily equal, i.e., one end may be tapered more severely than the other. One end 24, the more tapered, pointed end, carries four equally spaced slots or grooves 26 on its outer surface to provide a riser or nipple extractor end. The extractor end 24 is complimentary in diameter to standard sprinkler pipes and fittings, including sprinkler heads, for insertion into a head, riser, nipple, pipe or the like for tightening and loosening head-to-riser, riser-to-pipe, nipple-to-riser or other connections, and for extracting sprinkler heads, nipples, risers and other joint or pipe members. The opposite end 28 is tap-like, being threaded and having four, equally spaced broad relieved regions 30, much like a typical tap, for threading and correctively rethreading the interior of holes. Along the length of the body, the tool has at least one continuous groove or slot 32. One end of a generally straight, rigid rectangular handle stem 34 is pivotally pinned to the body 20 in the slot 32 midway along the length of the body 20. A handle crossbar 36 is fixedly, threadably attached to the other end of the stem and secured there by a set screw (FIG. 2). Together, the stem and crossbar cooperate to form a T-shaped handle. Referring to FIG. 3, on the side of the body 20 opposite the side to which the handle is attached, in the generally central portion thereof, the tool has two spaced projections 38 separated by a flattened region 40, thereby providing a spanner type wrench for the removal or tightening of sprinkler heads or other sprinkler system components.

Figure 4:
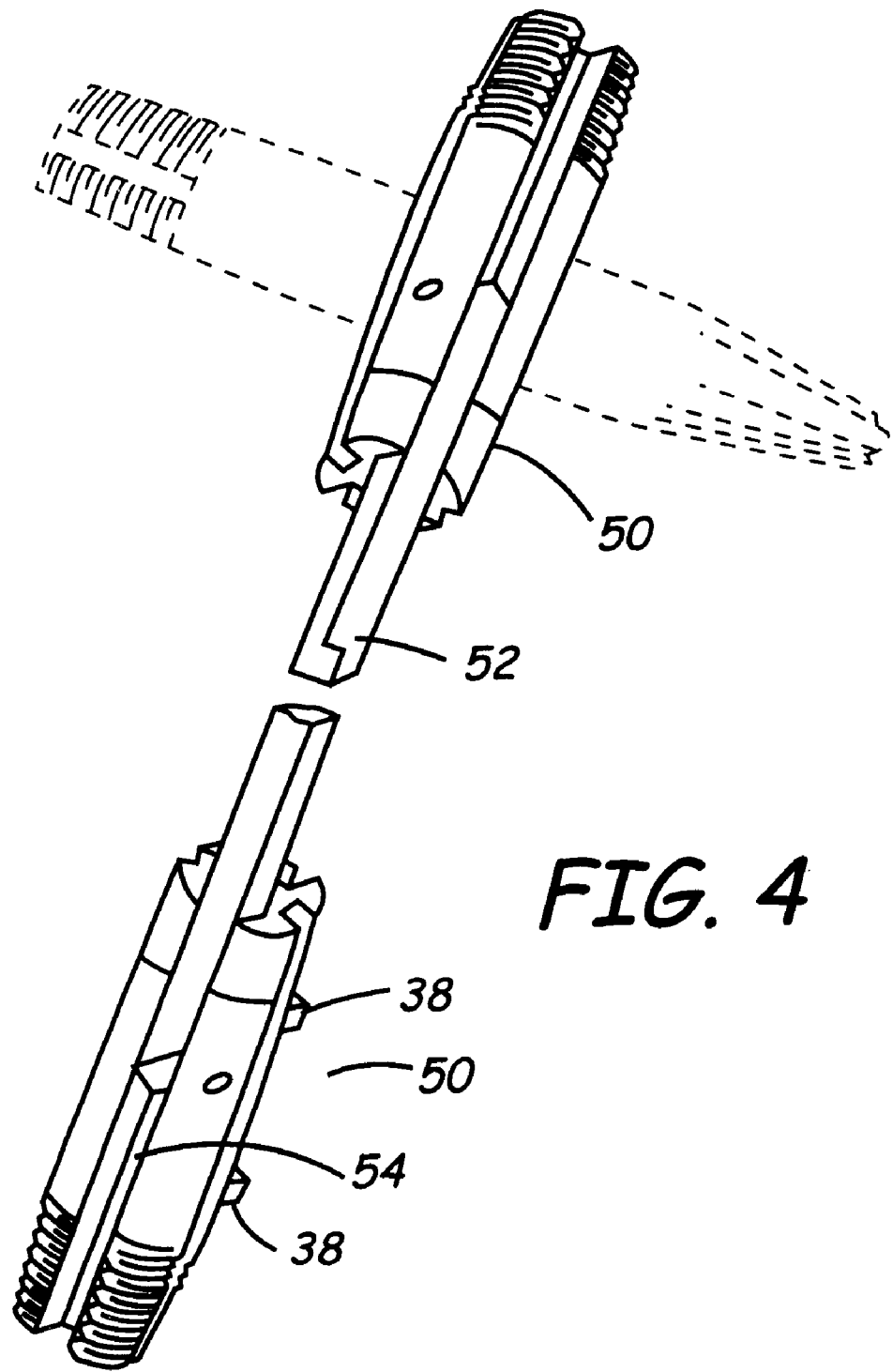
FIG. 4 is an isometric view of a second embodiment of the tool of the present invention depicting dual function handle/body members, including one depicted in phantom in a handle position.

Referring to FIG. 4, a second embodiment of the tool of the present invention is depicted. In this embodiment, a handle/body member 50 is pivotally coupled to each end of a generally straight, rigid stem 52. The handle/body members are generally similar to the body of the embodiment depicted in FIG. 2. In use, the stem 52 is removably received in the body slot 54 of one of the handle/body members, whereby the central longitudinal axis of that handle/body member (the lower handle/body member shown in FIG. 4) is generally parallel to the central longitudinal axis of the stem 52, and that handle/body member is the workpiece contacting, working end of the tool. The other handle/body member (the upper handle/body member shown in FIG. 4) may be pivoted so that its axis is transverse to the axis of the stem, 90 degrees is preferred, to function as a handle. Both of the handle/body members 50 of the embodiment of the tool depicted in FIG. 4 may include the spanner feature, or as shown, only one of the handle/body members (the lower one) may be so equipped. An advantage of this embodiment of the tool of the present invention is that it provides for more flexibility in use by including at least two sizes of taps and riser/nipple remover ends, yet still provides for compact storage and eliminates the need for multiple tools or tool heads.

Figure 5:
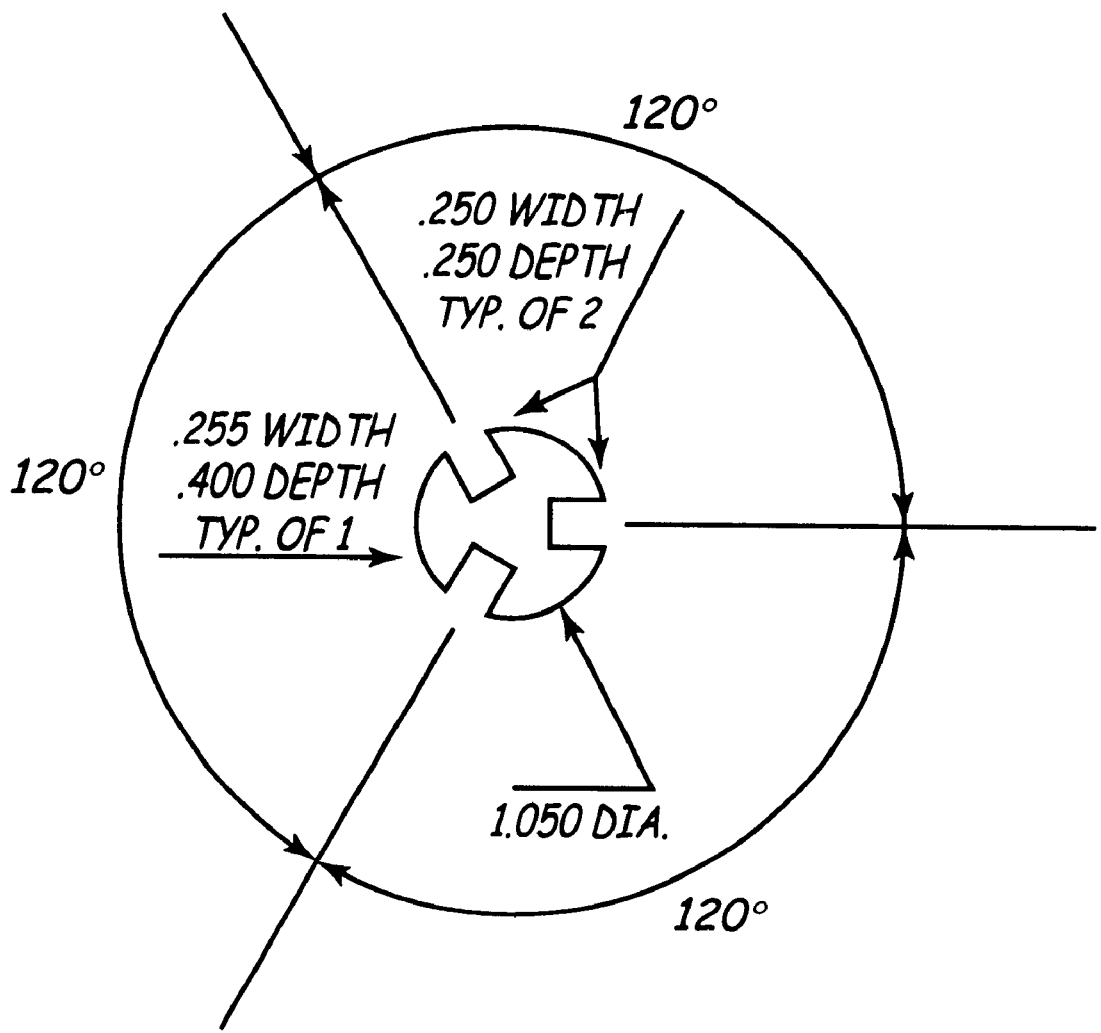
FIG. 5 is an elevational view of the riser or pipe removing "easy out" end of the present invention.

FIG. 5 depicts an alternative configuration of the ends of the body 20 or handle/body members 50 of the tool of the present invention.

Figure 6:
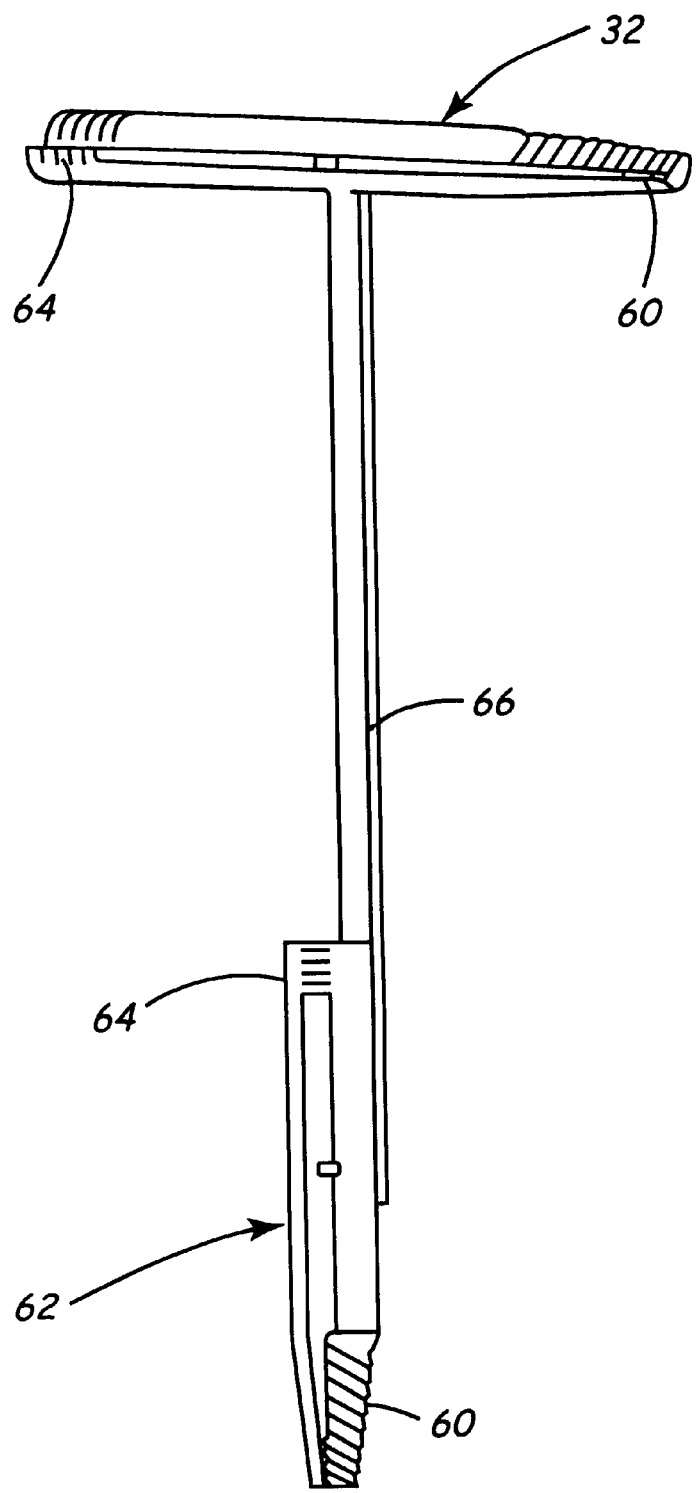
FIG. 6 is an elevational view of a third embodiment of the present invention.
Figure 7:
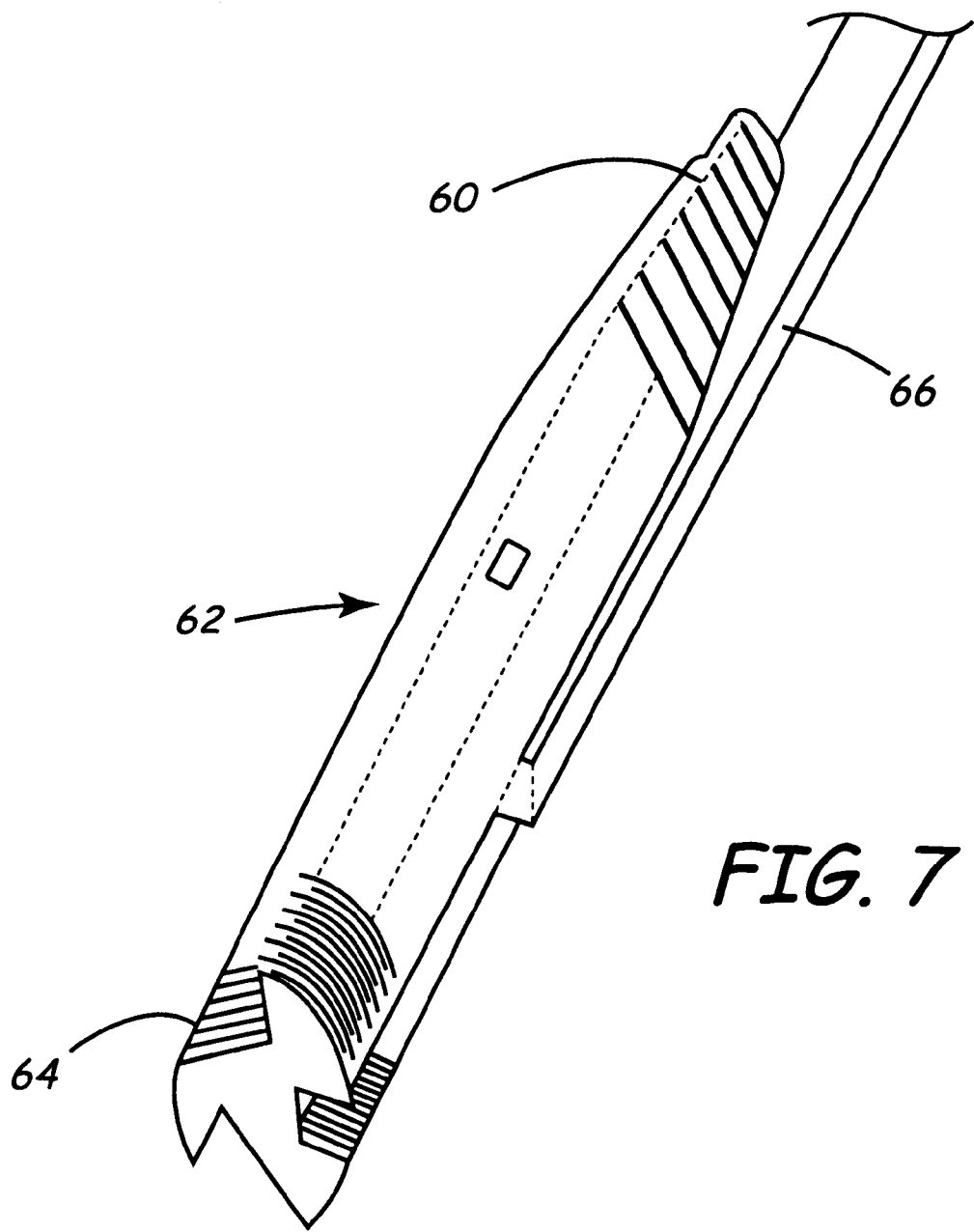
FIG. 7 is a perspective of one of the handle/body members of the third embodiment.

FIGS. 6 and 7 depict a third embodiment of the present invention wherein the extractor end 60 of each handle/body member 62 has left-hand or reverse threads, at approximately nine threads per inch, to facilitate the removal or extraction of a sprinkler head, riser, nipple or joint. The other end 64, i.e., the tap end, is substantially similar to the tapping end of the embodiment depicted in FIG. 1; however, both ends have three operative threaded surfaces, two relieved regions and the groove or slot for receiving the stem 66.

Figure 8:
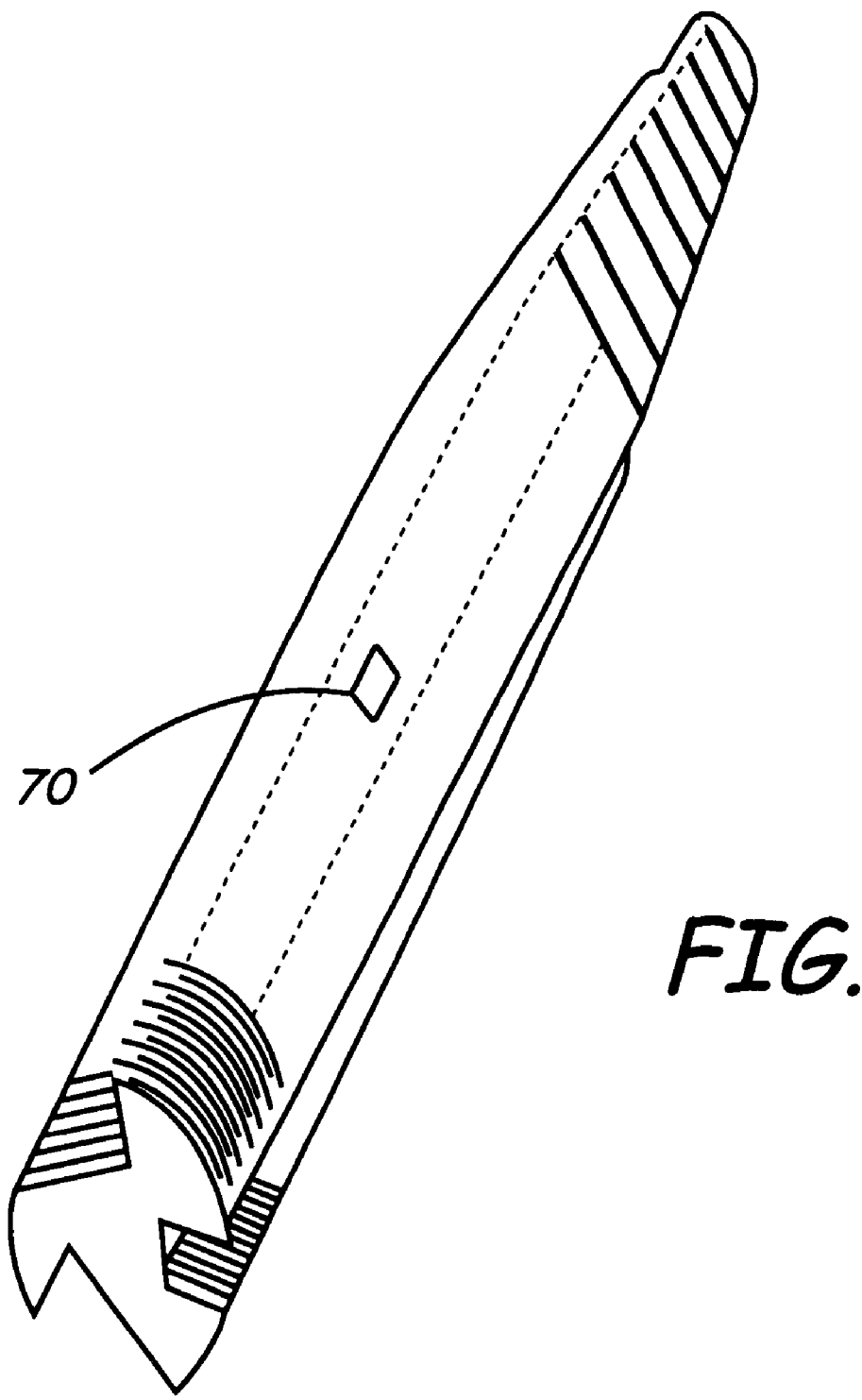
FIG. 8 is a view of a fourth embodiment of the present invention.
Figure 11:
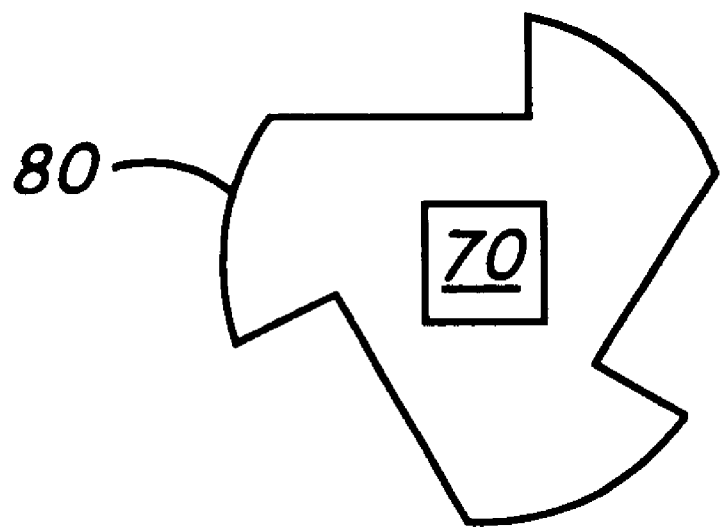
FIG. 11 is an elevational view of the riser or pipe removing end of the embodiment of the present invention as depicted in FIGS. 10a–e.
Figure 12A:
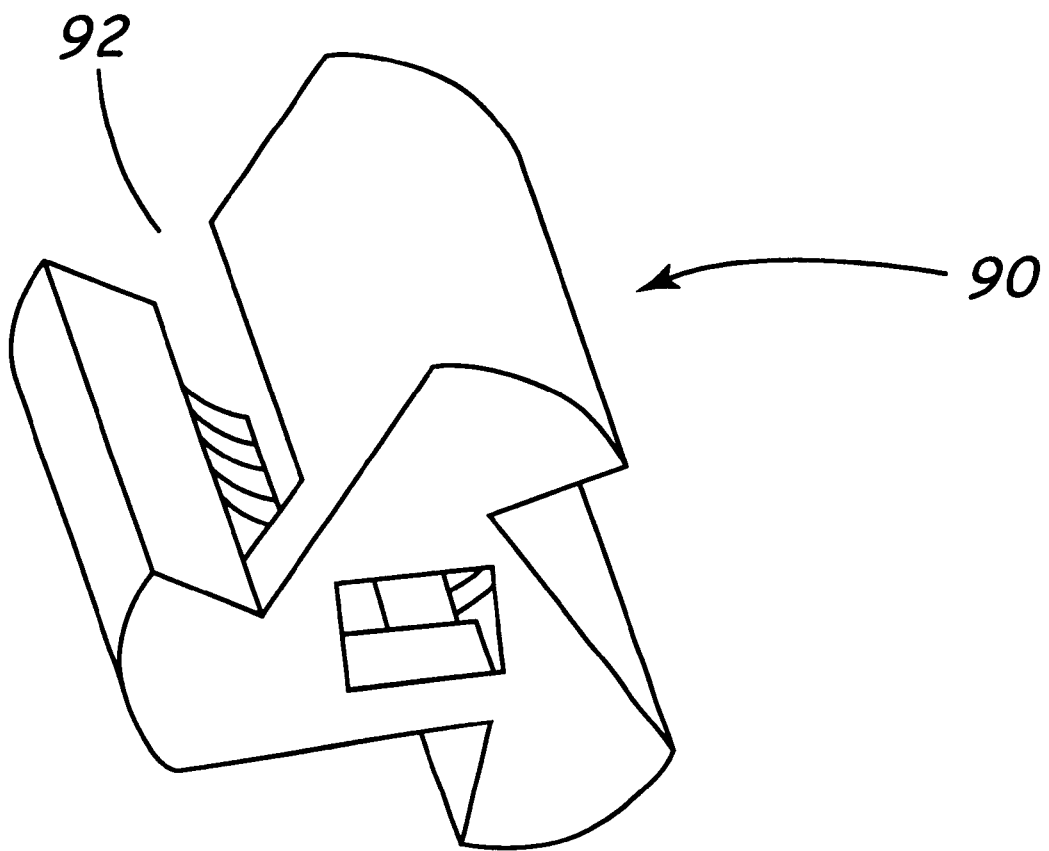
FIGS. 12a–d provide various perspective views of an exemplary one of the plurality of individual handle/body members of the "socket-set" embodiment of the tool of the present invention, wherein a screw die is provided.
Figure 12B:
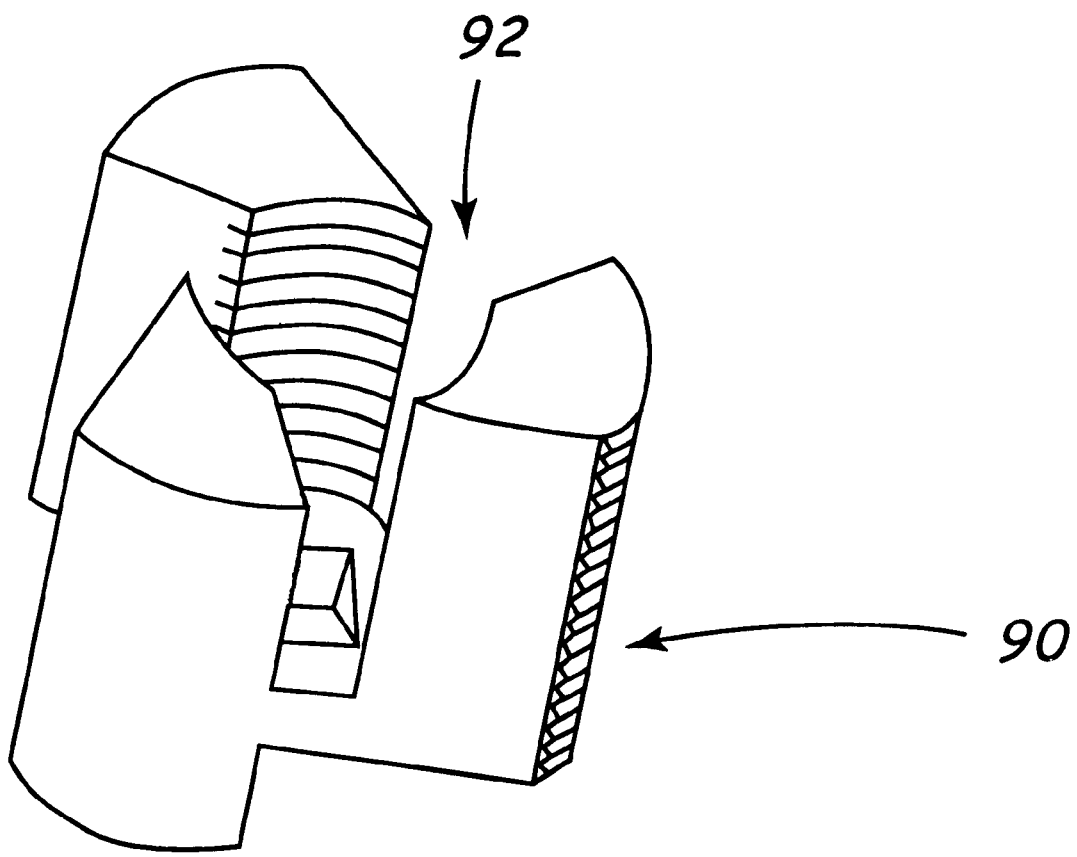
Figure 12C:
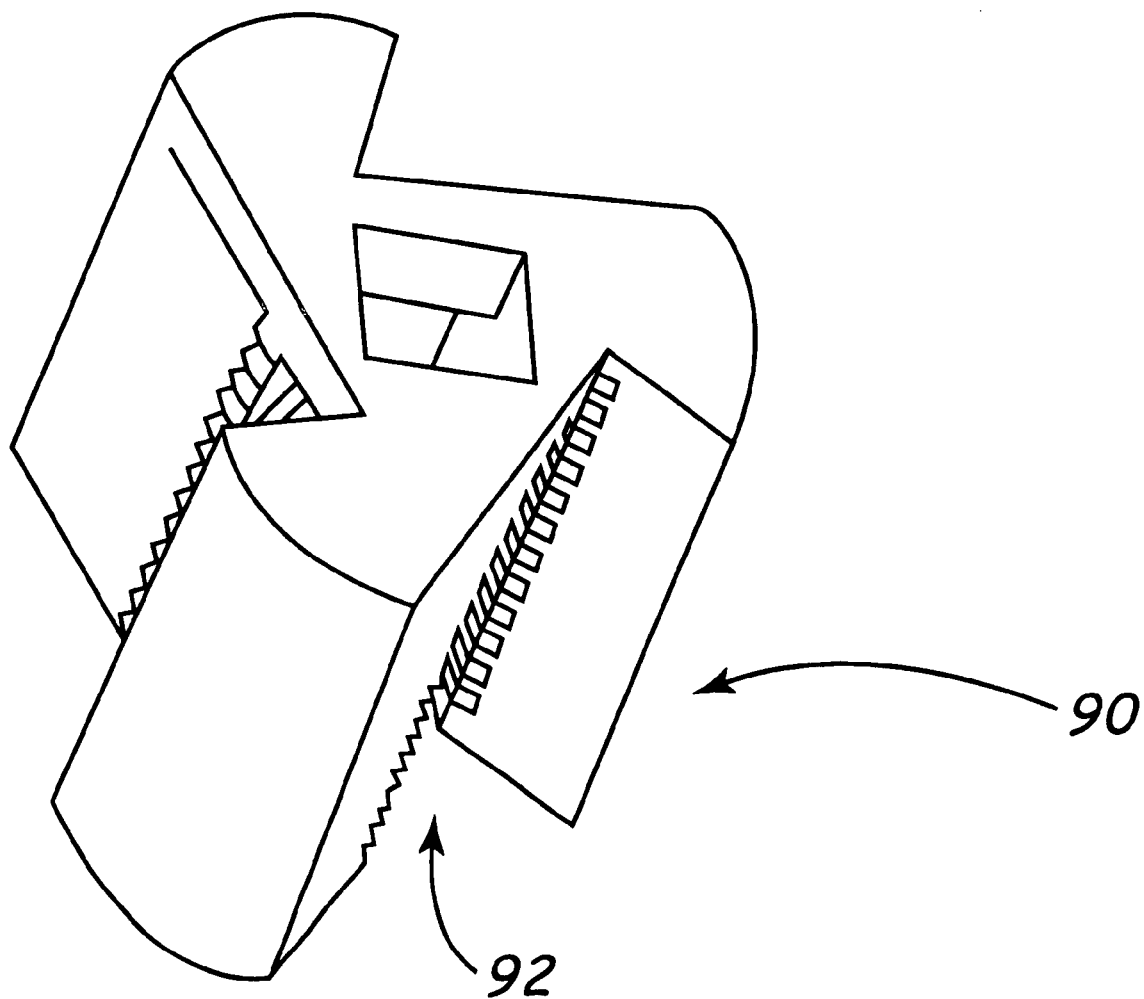
Figure 12D:
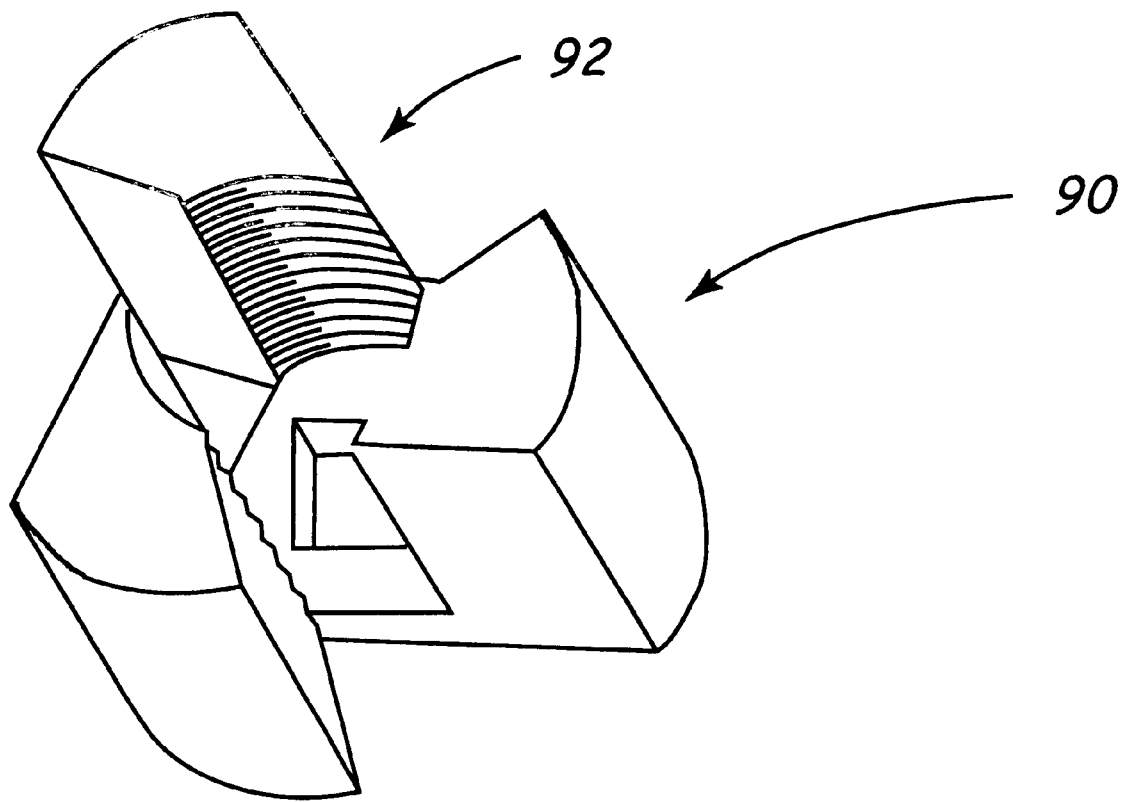

FIGS. 8 and 10*a–e* depict that the extractor and tap handle/body members 80 may be adapted for use without an attached stem by providing them with an appropriately shaped aperture (a square aperture is shown) or opening 70. Although the opening 70 can be anywhere in the stand alone handle/body members 80 (which, in this embodiment, are to be considered as socket-like tools or working heads) and more than one opening may be provided, the preferred locations (as shown in FIGS. 10*a–e*) are at both ends of the handle/body members 80, so that the central longitudinal axis of the handle/body member 80 is generally aligned with the center of the opening 70, and/or at the midpoint of the body (as depicted in FIG. 8). FIG. 8 depicts the mid-point opening of a stand alone handle/body member 80 wherein the opening is generally transverse to the longitudinal axis of the handle/body member. The mid-point opening facilitates the use of a handle/body member as a handle. FIG. 11 is an end view of a stand-alone handle/body member 80 showing the preferred location of the opening 70. It should be appreciated that any number of openings may be provided as long as the strength of the handle/body member is not adversely affected. The stand-alone handle/body members may be available in a range of sizes and materials whereby they are adapted to work on pipes, conduits and the like of various sizes and materials, and may be available in a set or kit form, with or without a driver. The opening(s) may be of different sizes and shapes (e.g., square, rectangular, hex or allen shaped) to accept different sizes and styles of drivers.

FIGS. 12*a–d* depict a screw die version 90 of the handle/body members of the present invention wherein one end 92 is adapted to thread or rethread the exterior of pipes, risers and the like. Like the extractor and tap handle/body members 80 depicted in FIGS. 8 and 10*a–e*, the screw die version 90 has at least one opening for operably receiving a driver, may be available in a range of sizes and materials whereby they are adapted to work on pipes, conduits and the like of various sizes and materials, and may be available in a set or kit form, with or without extractor and tap handle/body members 80 and a driver.

Figure 9:
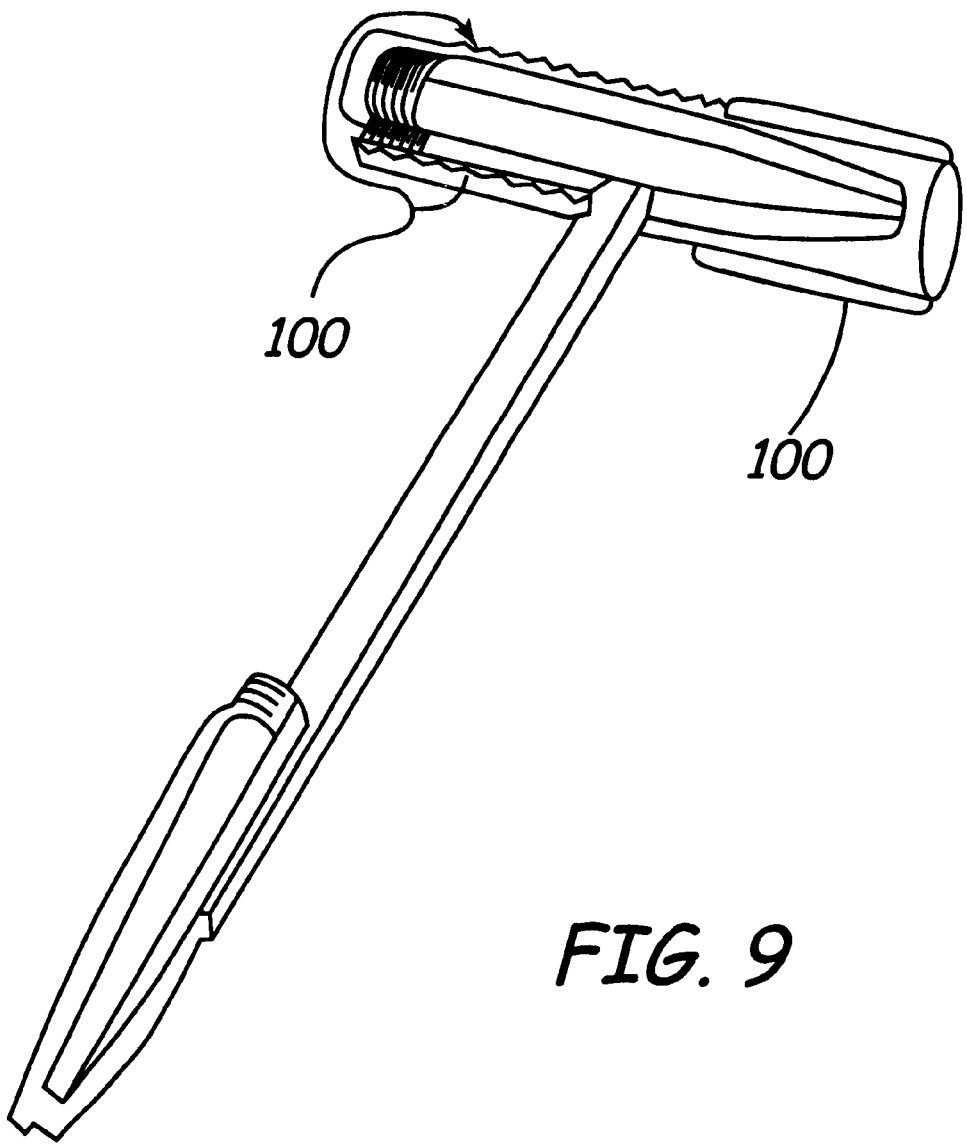
FIG. 9 depicts an embodiment of the tool of the present invention, wherein the ends of the handle/body member in the handle position are covered by removable ends caps.
Figure 10A:
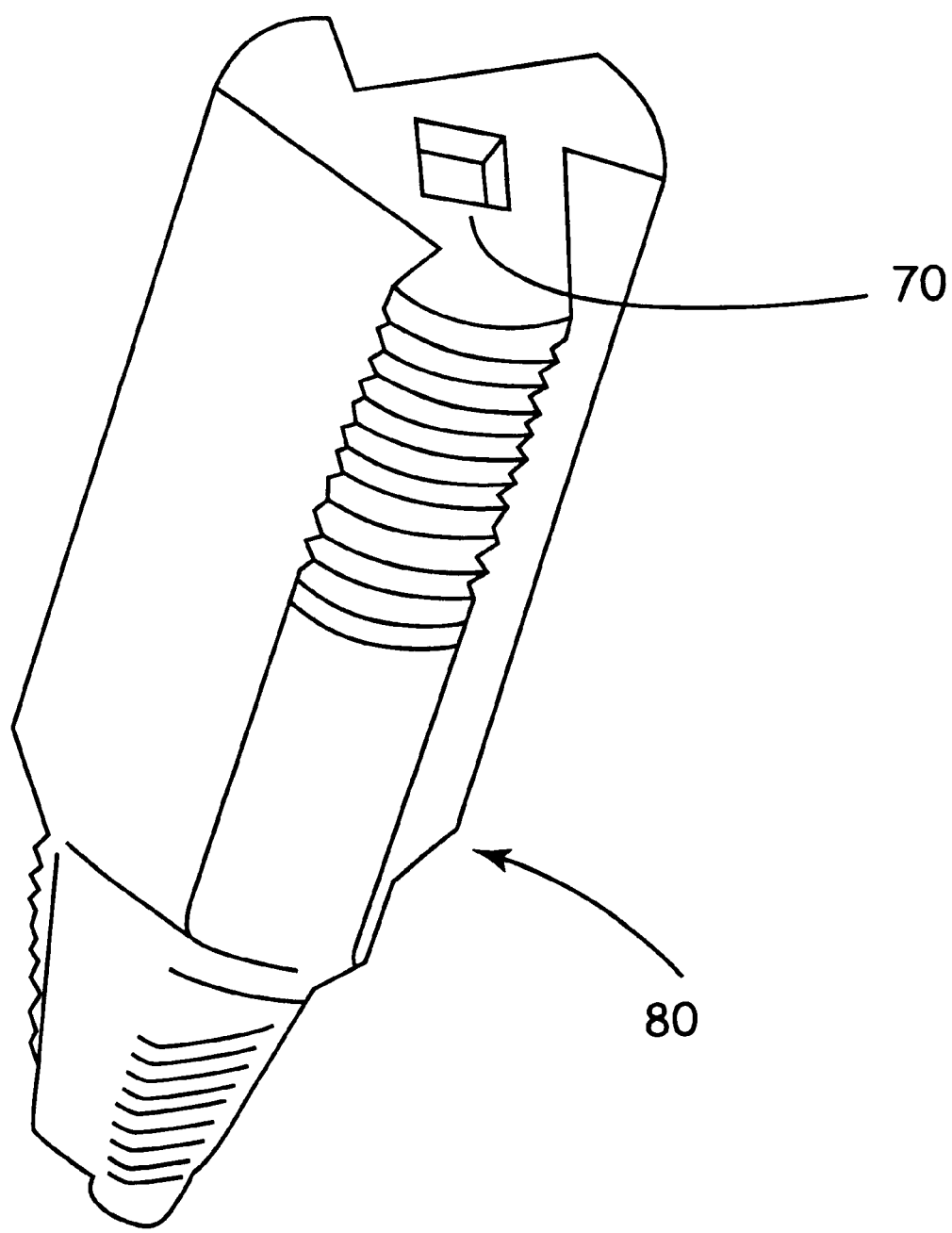
FIGS. 10a–e provide various perspective views of an exemplary one of the plurality of individual handle/body members of the "socket-set" embodiment of the tool of the present invention, wherein the dual functions of riser or pipe removal and threading or rethreading are provided.
Figure 10B:
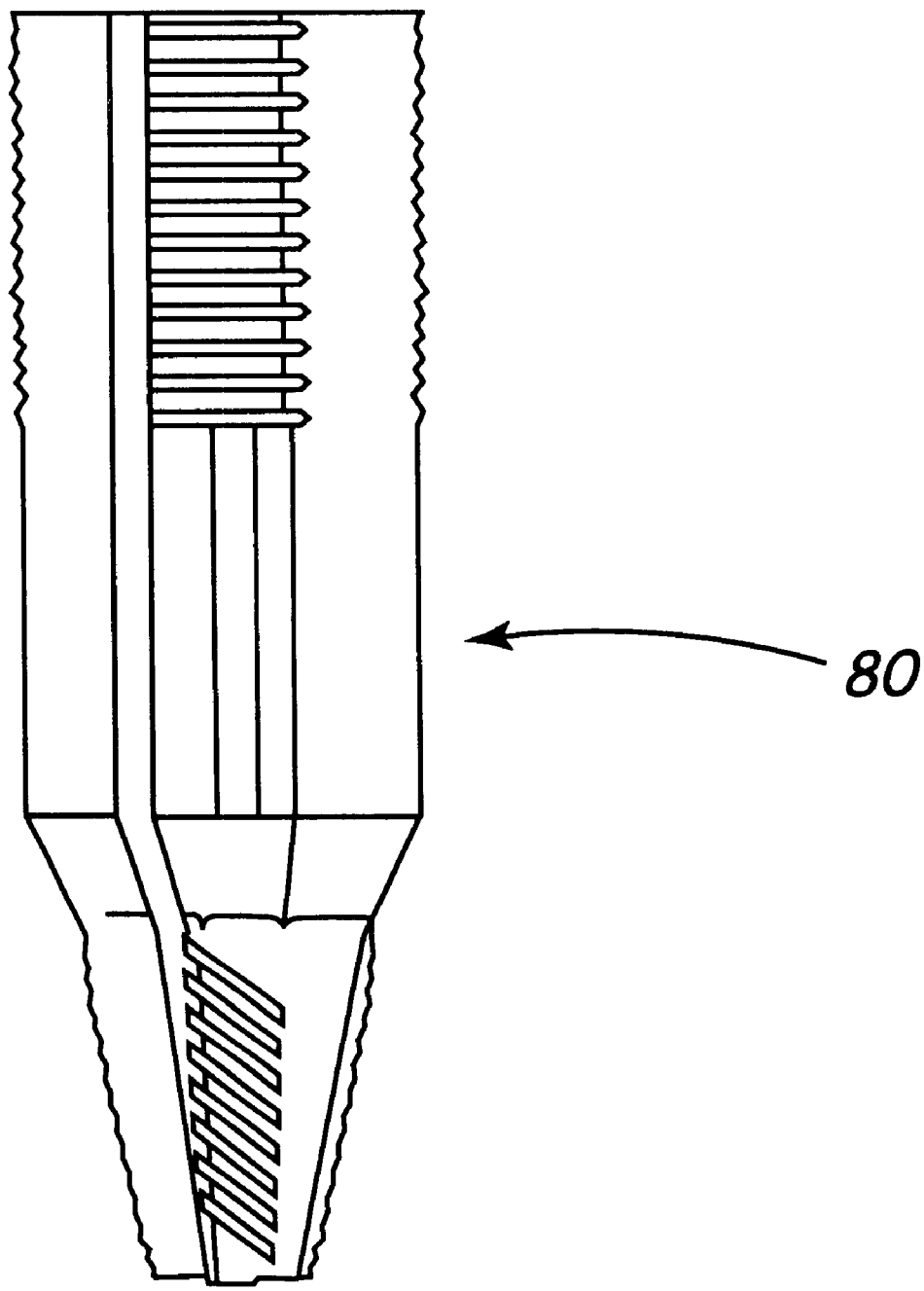
Figure 10C:
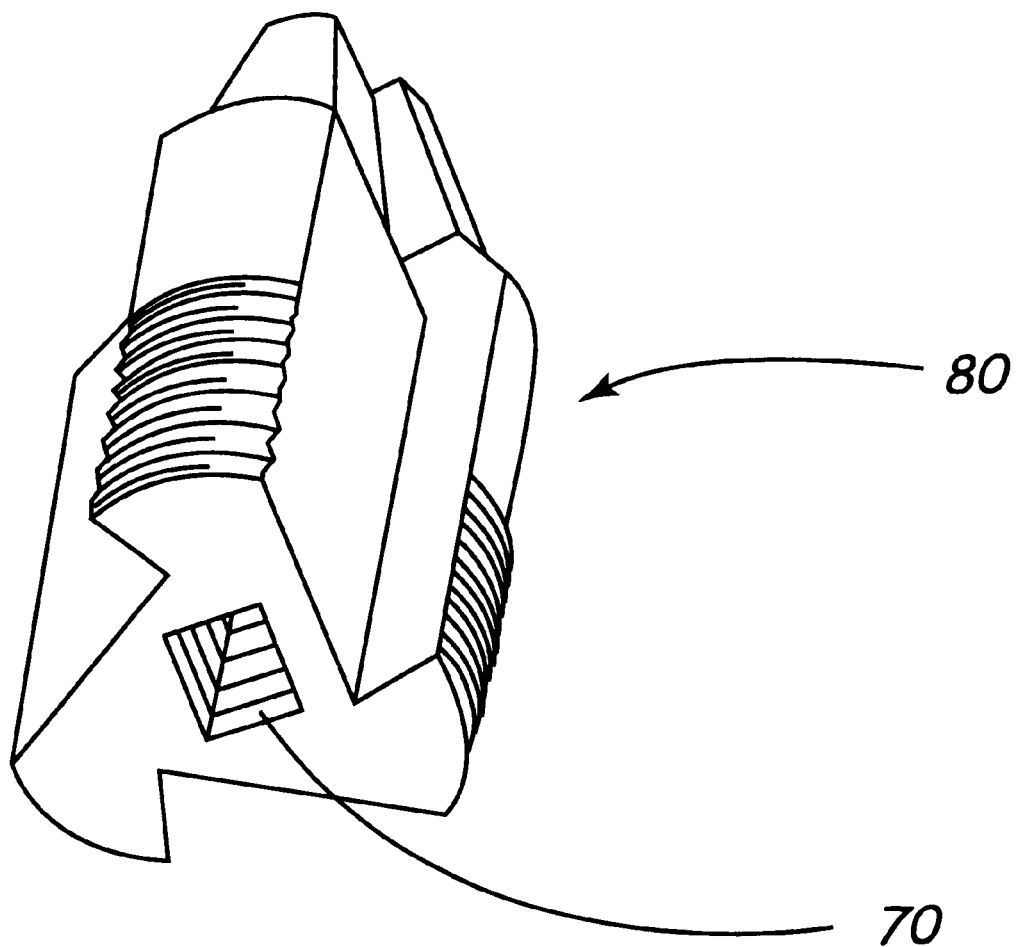
Figure 10D:
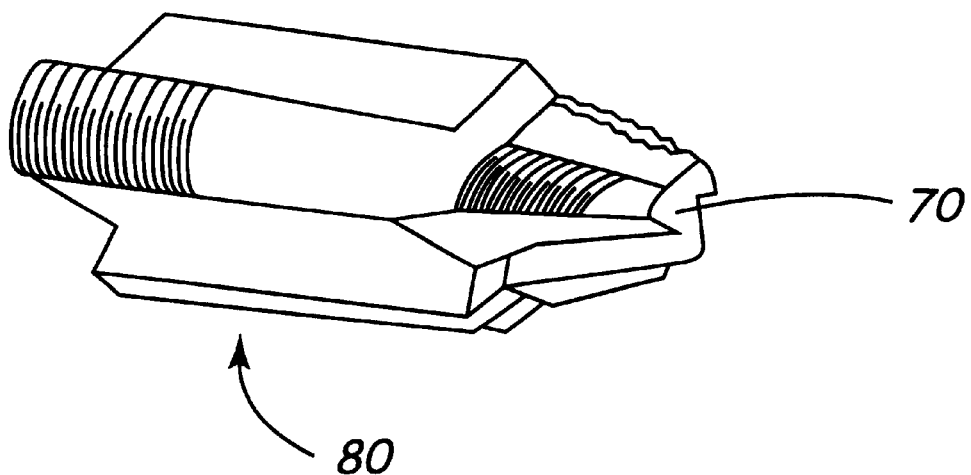
Figure 10E:
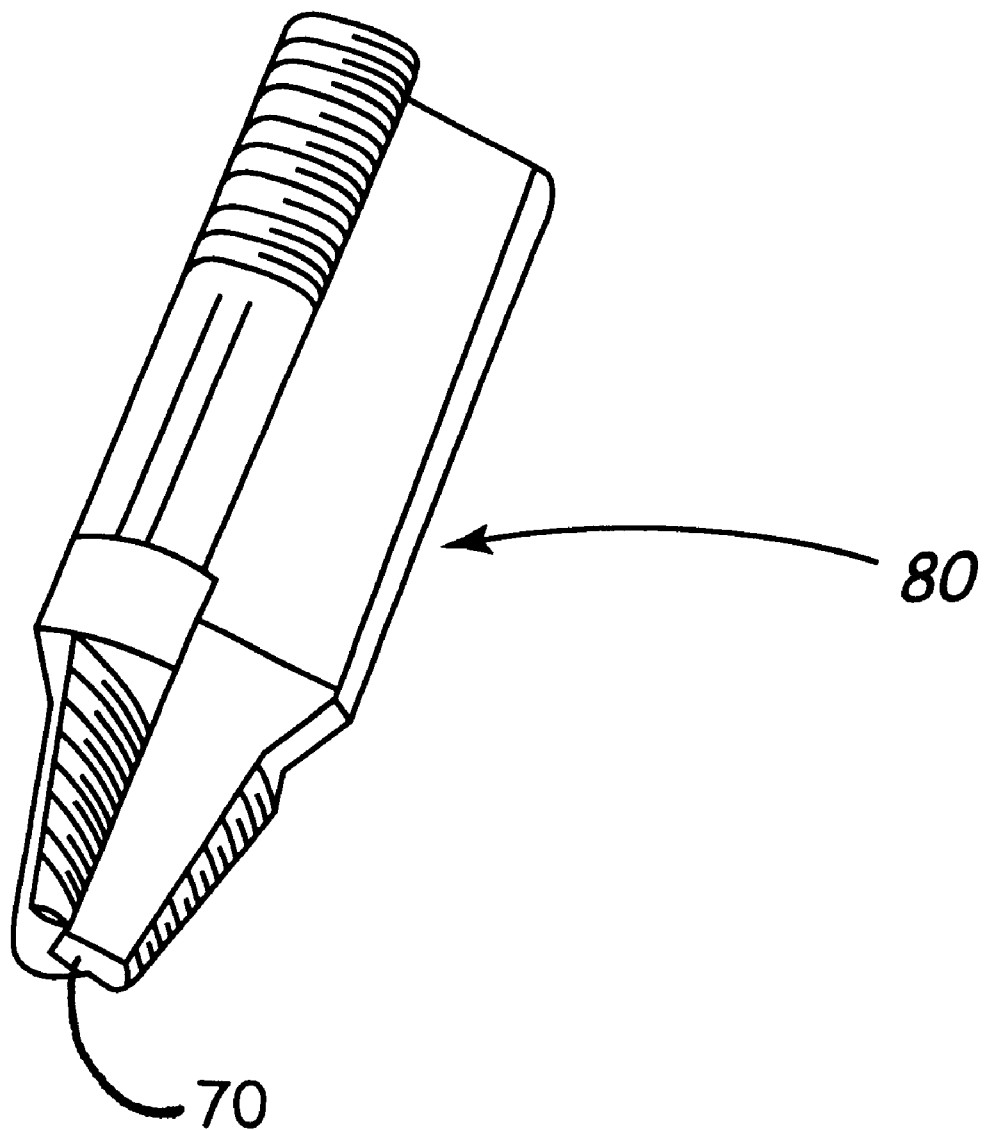

FIG. 9 depicts that the either or both the extractor or tap end of the tool of the present invention may be provided with removable caps 100. Preferably, the caps 100 are cup-like and fit tightly on the respective ends of the handle/body members of the tool. They serve to protect the ends, particularly the threaded portions thereof, and facilitate the use of the handle/body members as a handle, protecting users' hands from the threads and/or sharp edges. Any suitable plastic, vinyl or like material may be used to form the caps 100.

The appended drawings and claims are provided to illustrate and further describe the present invention. Those skilled in the art should appreciate that other embodiments of the present invention fall within the scope of the present invention.

I claim:

1. A tool comprising:

an elongated stem having two ends, and a dual function tool head pivotally coupled to one of the two ends, wherein the tool head defines a groove that is generally straight and that runs longitudinally along the length of the tool head, wherein the stem engages the groove when pivoted into an engaged position parallel to the tool head, and wherein the tool head comprises an extractor end that is tapered and has a relieved region.

2. The tool of claim 1, wherein the extractor end has reverse threads for facilitating disassembly of a pipe or a joint.

3. The tool of claim 2, wherein the reverse threads are spaced nine threads per inch.

4. A tool comprising:

an elongated stem having two ends, and a dual function tool head pivotally coupled to one of the two ends, wherein the tool head defines a groove that is generally straight and that runs longitudinally along the length of the tool head, wherein the stem engages the groove when pivoted into an engaged position parallel to the tool head, and wherein the tool head comprises a tap end having threads for repairing pipes and connections.

5. A tool comprising:

an elongated stem, a first dual function tool head pivotally coupled to one end of the stem, and a second dual function tool head connected to the other end of stem, wherein the first tool head has a groove which runs generally longitudinally along the length of the first tool head, and wherein the stem engages the groove of the first tool head when pivoted into an engaged position parallel to the first tool head.

6. The tool of claim 5, wherein the first tool head is generally cylindrical and has a first end that is tapered and has a relieved region.

7. The tool of claim 5, wherein the first tool head has reverse threads for facilitating disassembly of a pipe or a joint.

8. A tool comprising:

an elongated stem; and a first dual function tool head having a longitudinal axis, a body portion, and first and second ends, the tool head being pivotally coupled to the stem, wherein the stem limits pivotal movement of the tool head about the stem to a range, and wherein the first end is an extractor end that is tapered and has a relieved portion, and wherein the second end is a tap end for repairing pipes or fittings.

9. The tool of claim 8, wherein the range is 180 degrees, and wherein the longitudinal axis of the tool head is substantially parallel to the stem at ends of the range.

10. The tool of claim 8, wherein the tool head has a groove, and wherein the stem engages the groove when the tool head is pivoted such that the longitudinal axis of the tool head is substantially parallel to the stem.

11. The tool of claim 8, wherein an end of the stem is pivotally coupled to a midpoint of the body portion of the tool head.

12. The tool of claim 8, wherein the extractor end has left-handed threads for facilitating the disassembly of a joint or fitting.

13. A sprinkler repair tool comprising:

a stem;

a generally cylindrical tool head having a longitudinal axis, pivotally coupled to an end of the stem, the tool head comprising:

a body portion;

means for repairing pipes or fittings, said means being disposed at a first end of the body portion; and means for disassembling joints, said means being disposed at a second end of the body portion and comprising a tapered end having a relieved portion for engaging a pipe or fitting; and means for limiting movement of the tool head about the stem, such that the longitudinal axis of the tool head may be rotated to a position substantially parallel to the stem and to a position substantially perpendicular to the stem.

14. A sprinkler repair tool comprising:

a stem;

a generally cylindrical tool head having a longitudinal axis, pivotally coupled to an end of the stem, the tool head comprising:

a body portion;

means for repairing pipes or fittings, said means being disposed at a first end of the body portion; and means for disassembling joints, said means being disposed at a second end of the body portion and comprising a reverse thread means for engaging a pipe or a fitting; and means for limiting movement of the tool head about the stem, such that the longitudinal axis of the tool head may be rotated to a position substantially parallel to the stem and to a position substantially perpendicular to the stem.

15. The sprinkler tool of claim 14, wherein the means for limiting movement comprises a slot defined in the body portion of the tool head, wherein the stem engages the slot when the longitudinal axis is rotated substantially parallel to the stem.

16. The sprinkler tool of claim 15, wherein the reverse threads are spaced nine threads per square inch.

* * * * *